(12) United States Patent
Pinney

(10) Patent No.: US 7,962,265 B2
(45) Date of Patent: Jun. 14, 2011

(54) VEHICULAR LINEAR SENSOR SYSTEM

(75) Inventor: Charles P. Pinney, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 867 days.

(21) Appl. No.: 11/946,385

(22) Filed: Nov. 28, 2007

(65) Prior Publication Data

US 2009/0138140 A1    May 28, 2009

(51) Int. Cl.
| | |
|---|---|
| G02B 23/16 | (2006.01) |
| G03B 29/00 | (2006.01) |
| G03B 5/06 | (2006.01) |
| F41G 11/00 | (2006.01) |
| H04N 5/232 | (2006.01) |
| H04N 5/247 | (2006.01) |
| H04N 5/28 | (2006.01) |

(52) U.S. Cl. ............ 701/49; 701/2; 701/3; 700/247; 700/259; 702/5; 244/129.1; 348/145; 356/5.01

(58) Field of Classification Search .......... 701/2, 3, 701/49; 244/129.1; 702/5; 700/247, 259; 348/145; 356/5.01
See application file for complete search history.

(56) References Cited

U.S. PATENT DOCUMENTS

| | | | | |
|---|---|---|---|---|
| 4,123,134 A | * | 10/1978 | Meyers | 359/216.1 |
| 4,281,928 A | * | 8/1981 | Brunson | 356/140 |
| 4,298,280 A | * | 11/1981 | Harney | 356/5.06 |
| 4,381,144 A | * | 4/1983 | Breslau | 396/27 |
| 4,886,222 A | * | 12/1989 | Burke | 244/1 R |
| 4,991,149 A | * | 2/1991 | Maccabee | 367/128 |
| 5,105,672 A | | 4/1992 | Carson et al. | |
| 5,575,438 A | * | 11/1996 | McGonigle et al. | 244/13 |
| 5,852,672 A | * | 12/1998 | Lu | 382/154 |
| 5,878,283 A | * | 3/1999 | House et al. | 396/6 |
| D412,920 S | * | 8/1999 | Diebel et al. | D16/132 |
| 5,966,129 A | * | 10/1999 | Matsukuma et al. | 345/418 |
| D417,881 S | * | 12/1999 | Diebel et al. | D16/132 |
| 6,151,118 A | * | 11/2000 | Norita et al. | 356/602 |
| 6,193,188 B1 | * | 2/2001 | Ahmad et al. | 244/3.16 |
| 6,422,508 B1 | * | 7/2002 | Barnes | 244/3.16 |
| 6,445,498 B1 | * | 9/2002 | Baun et al. | 359/430 |
| 6,533,674 B1 | * | 3/2003 | Gobush | 473/199 |
| 6,563,636 B1 | * | 5/2003 | Baun et al. | 359/429 |
| 6,592,465 B2 | * | 7/2003 | Lutz et al. | 473/198 |
| 6,616,097 B2 | * | 9/2003 | Hilbert | 244/118.1 |
| 6,707,761 B2 | * | 3/2004 | Erikson | 367/131 |
| 6,862,084 B2 | * | 3/2005 | Nagata et al. | 356/5.01 |
| 7,127,348 B2 | * | 10/2006 | Smitherman et al. | 701/208 |
| 7,363,157 B1 | * | 4/2008 | Hanna et al. | 702/5 |

(Continued)

*Primary Examiner* — Mark Hellner
*Assistant Examiner* — Ari M Diacou
(74) *Attorney, Agent, or Firm* — Ingrassia Fisher & Lorenz, P.C.

(57) ABSTRACT

Vehicular sensor systems are provided. The vehicular sensor systems includes a support, first, second, and third sensors, and a support actuator. The first sensor is coupled to the support and configured to rotate about a first sensor axis. The first sensor has a first field of detection with a first central axis. The second sensor is coupled to the support and configured to rotate about a second sensor axis. The second sensor has a second field of detection with a second central axis. The third sensor is coupled to the support and configured to rotate about a third sensor axis. The third sensor has a third field of detection with a third central axis. The support actuator is coupled to the support and configured to rotate the support about a support axis. The first, second, and third central axes are substantially within a plane.

17 Claims, 4 Drawing Sheets

U.S. PATENT DOCUMENTS

| | | | | |
|---|---|---|---|---|
| 7,773,116 B1* | 8/2010 | Stevens | | 348/208.4 |
| 2001/0035995 A1* | 11/2001 | Ruggiero | | 359/152 |
| 2002/0093564 A1* | 7/2002 | Israel | | 348/145 |
| 2003/0095186 A1* | 5/2003 | Aman et al. | | 348/162 |
| 2006/0055706 A1* | 3/2006 | Perlman et al. | | 345/589 |
| 2007/0228214 A1 | 10/2007 | Horak | | |
| 2009/0100995 A1* | 4/2009 | Fisher | | 89/1.11 |
| 2009/0284644 A1* | 11/2009 | Mckaughan et al. | | 348/348 |
| 2010/0141503 A1* | 6/2010 | Baumatz | | 342/27 |

* cited by examiner

VEHICULAR LINEAR SENSOR SYSTEM

GOVERNMENT RIGHTS

This invention was made with Government support under Contract W56HZV-05-C-0724, awarded by the U.S. Army. The Government has certain rights in this invention.

TECHNICAL FIELD

The present invention generally relates to sensor systems, and more particularly relates to a linear sensor system for use in a vehicle, such as an aircraft.

BACKGROUND

In recent years, advances in technology have led to substantial changes in the design of vehicles of all types, including aircraft, watercraft, and land vehicles. One of the changes involves an ever-increasing demand for lighter, more efficient vehicles. This is particularly true with unmanned aerial vehicles (UAV), such as micro air vehicles (MAV). MAVs will likely soon be used for a wide variety of both commercial and military purposes, including surveillance. As such, MAVs often include a sensor system or array with several different types of sensors (or electromagnetic devices), such as cameras and lasers. As MAVs continue to decrease in size, the demand for more compact and efficient arrangements of the various components, including the sensors, will become even greater.

Accordingly, it is desirable to provide a sensor system in which the sensors are arranged in such a way to minimize weight and cost while still providing full functionality. Furthermore, other desirable features and characteristics of the present invention will become apparent from the subsequent detailed description of the invention and the appended claims, taken in conjunction with the accompanying drawings and this background of the invention.

BRIEF SUMMARY

A vehicular sensor system is provided. The vehicular sensor system includes a support, first, second, and third sensors, and a support actuator. The first sensor is coupled to the support and configured to rotate about a first sensor axis. The first sensor has a first field of detection with a first central axis. The second sensor is coupled to the support and configured to rotate about a second sensor axis. The second sensor has a second field of detection with a second central axis. The third sensor is coupled to the support and configured to rotate about a third sensor axis. The third sensor has a third field of detection with a third central axis. The support actuator is coupled to the support and configured to rotate the support about a support axis. The first, second, and third central axes are substantially within a plane.

A vehicular sensor system is provided. The vehicular sensor system includes a support, first, second, and third sensors, and a support actuator. The first sensor is coupled to the support and has a first field of detection with a first central axis. The second sensor is coupled to the support and has a second field of detection with a second central axis. The third sensor is coupled to the support and has a third field of detection with a third central axis. The support actuator is coupled to the support and configured to rotate the support about a support axis. The first, second, and third central axis are substantially within a plane, and the support axis is substantially parallel to the plane.

An unmanned aerial vehicle (UAV) is provided. The UAV includes a frame, a flight system coupled to the frame and configured to apply lift to the frame, a sensor array coupled to the frame, and a processor coupled to the frame. The sensor array includes a support and first, second, and third sensors coupled to the support to rotate about respective first, second, and third substantially parallel sensor axes and having fields of detection with respective first, second, and third substantially co-planar central axes. The processor is in operable communication with the flight system and the sensor array and is configured to control said application of lift to the frame and said rotation of the first, second, and third sensors.

BRIEF DESCRIPTION OF THE DRAWINGS

The present invention will hereinafter be described in conjunction with the following drawing figures, wherein like numerals denote like elements.

DETAILED DESCRIPTION

Figure 1:
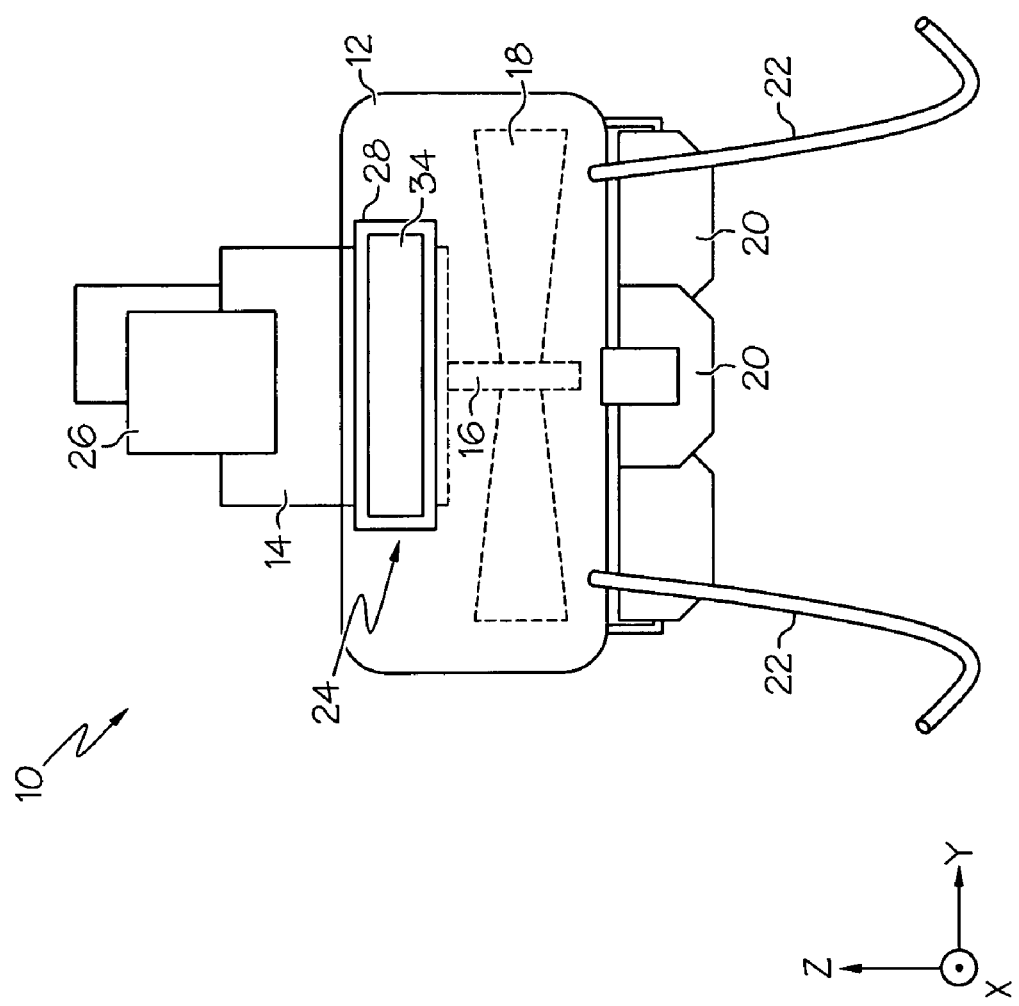
FIG. 1 is a side view of a micro air vehicle (MAV) according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-4 are merely illustrative and may not be drawn to scale.

Further, a Cartesian coordinate system, including x, y, and z axes and/or directions, is shown in the drawings to clarify the relative orientation of the components, according to the various embodiments. However, this coordinate system is only intended to assist in the explanation of various aspects of the present invention, and should be not construed as limiting.

FIG. 1 to FIG. 4 illustrate a vehicular sensor system. The vehicular sensor system includes a support, first, second, and third sensors, and a support actuator. The first sensor is coupled to the support and configured to rotate about a first sensor axis. The first sensor has a first field of detection with a first central axis. The second sensor is coupled to the support and configured to rotate about a second sensor axis. The second sensor has a second field of detection with a second central axis. The third sensor is coupled to the support and configured to rotate about a third sensor axis. The third sensor has a third field of detection with a third central axis. The support actuator is coupled to the support and configured to rotate the support about a support axis. The first, second, and third central axes are substantially within a plane.

The system may also include at least one sensor actuator coupled to the first, second, and third sensors and the support and configured to cause said rotation of the first, second, and third sensors about the respective first, second, and third sensor axes. The first, second, and third sensor axes may be substantially co-planar. The first, second, and third central axes may be substantially parallel.

FIG. 1 illustrates an unmanned aerial vehicle (UAV) according to one embodiment of the present invention. In the depicted embodiment, the UAV is a micro air vehicle (MAV)

10 including a main duct 12, an actuator 14, a drive shaft 16, a rotor 18, sub-ducts 20, legs 22, a sensor system 24, and an electronic controller 26.

In one embodiment, the main duct 12 is substantially annular and made of a composite material, such as a plastic and/or graphite. As will be apparent from the description below, the main duct 12 may serve as a frame for the MAV 10. Although not illustrated, the main duct may have, for example, a diameter (i.e., as measured along the x-axis or the y-axis) of between 8 and 12 inches. The actuator 14 is a torque producing engine connected to and partially housed within the main duct 12. The drive shaft 16 is coupled to a bottom of the actuator 14 at a central portion of the main duct 12. The rotor, or propeller, 18 is connected to an end of the drive shaft 16 within a central portion of the main duct 12 and may have a diameter of, for example, between 6 and 10 inches. The sub-ducts 20 are moveable coupled to a lower end of the main duct 12 and may be made of a material similar to the main duct 12. The main duct 12, the sub-ducts 20, the actuator 14, and the rotor 18 may jointly form a flight system which generates lift for the MAV 10. Although not shown, the MAV 10 may also include a stator coupled to the main duct 12 which is used to provide "anti-torque," as is commonly understood, for the MAV 10 during flight.

The legs 22 are connected to a periphery of the lower end of the main duct 12 and in one embodiment are made of a metal, such as aluminum. Although not shown, the MAV 10 may have an overall height of, for example, between 10 and 15 inches. Also, as is commonly understood, rotation about the z-axis shown may correspond to a "yaw" motion of the MAV 10, and rotation about the y-axis shown may correspond to a "pitch" direction of the MAV 10. Yaw motion of the MAV 10 corresponds to the "azimuth" of the sensor system 24 as depicted in the embodiment of FIG. 1. Pitch motion of the MAV 10 corresponds to the "elevation" of the sensor system 24 as depicted in the embodiment of FIG. 1.

Figure 2:
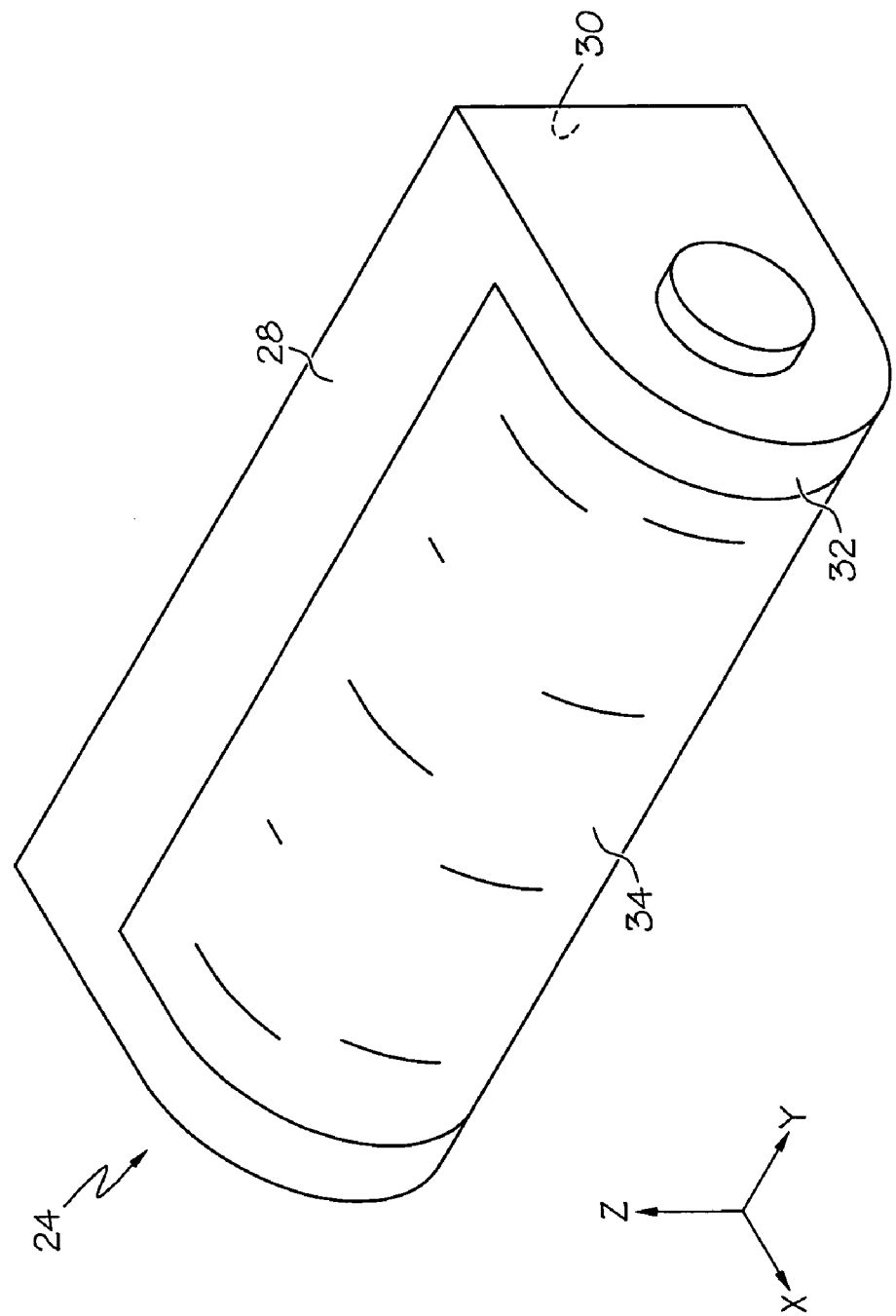
FIG. 2 is an isometric view of a housing for a sensor system onboard the MAV of FIG. 1.

Referring to FIGS. 1 and 2, the sensor system 24 includes a housing 28 connected to a side of the main duct 12 near an upper end thereof. The housing 28 is substantially rectangular with a substantially flat inner side 30 adjacent to the main duct 12 and a rounded outer side 32 opposing the main duct 12. The housing 28 has an opening or window 34 on the outer side 32 thereof which follows the rounded shape of the remainder of the outer side 32. Although not specifically illustrated, the housing 28 may have a width (as measured along the y-axis) of between 4 and 8 inches.

Figure 3:
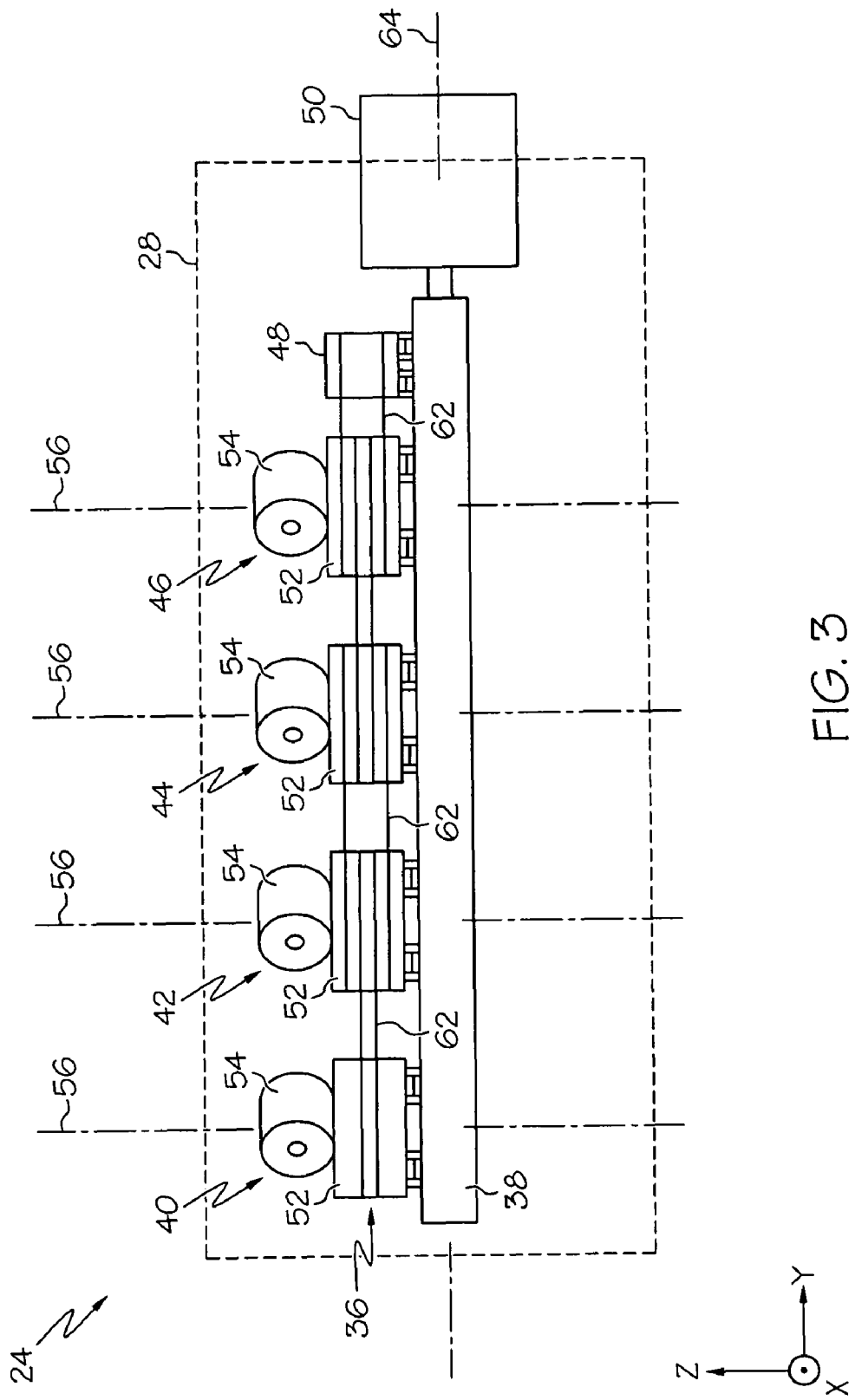
FIG. 3 is a side view of a sensor array within the housing of FIG. 2.
Figure 4:
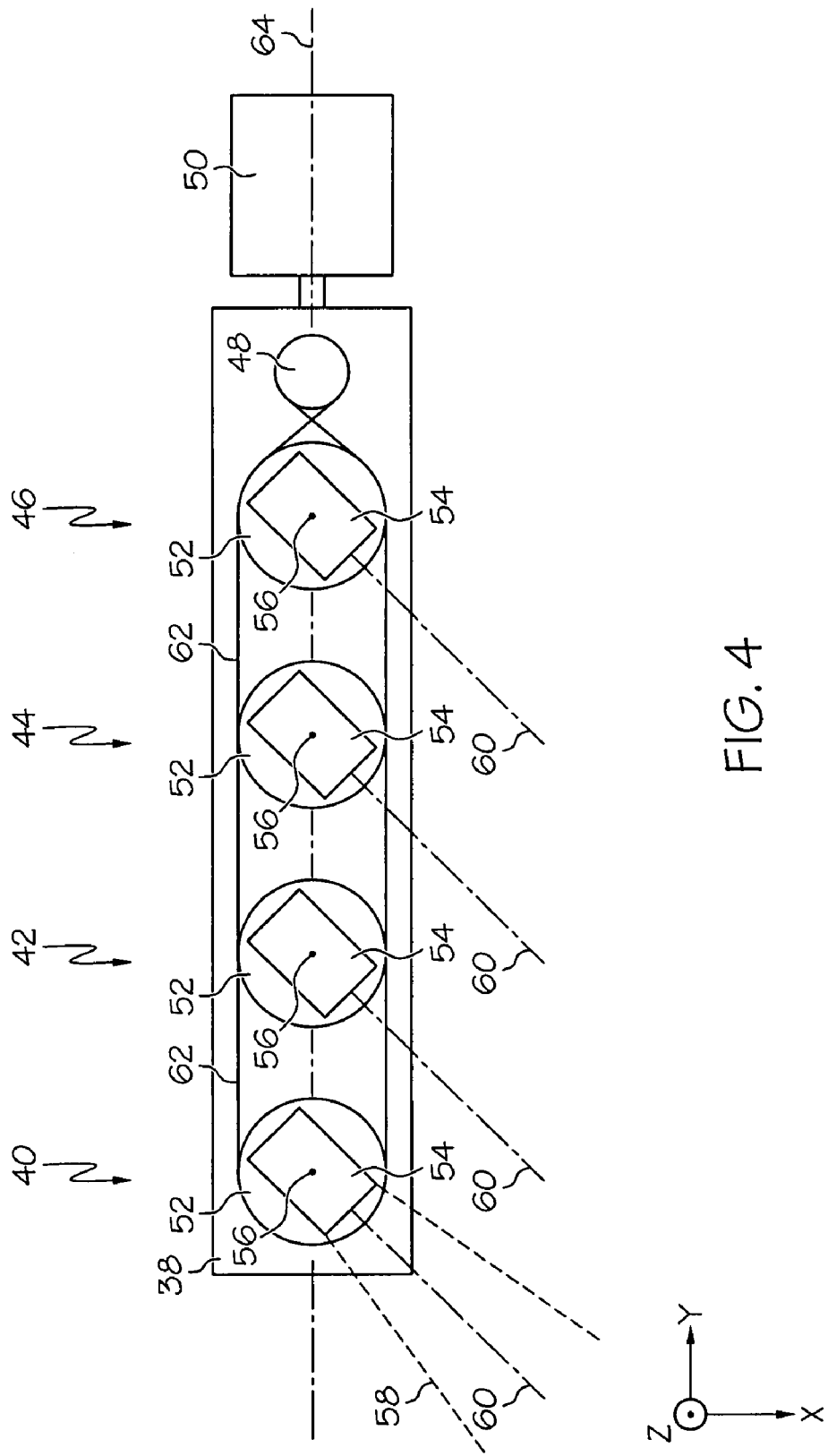
FIG. 4 is a top view of the sensor array of FIG. 3.

As illustrated in FIGS. 3 and 4, within the housing 28, the sensor system 24 includes a sensor array 36. The sensor array 36 includes a sensor support 38, four sensor assemblies 40-46, a sensor actuator 48, and a support actuator 50. In the depicted embodiment, the support 38 is a rectangular substrate or platform having planar opposing sides with its length (i.e., longer dimension) extending substantially along the y-axis and its width (i.e., shorter dimension) extending substantially along the x-axis. The support 38 may be connected to the housing 28 through the support actuator 50.

The sensor assemblies (or sensors) 40-46 are linearly arranged on one side (e.g., upper) of the support 38 and each include a spindle 52 that is rotatably coupled to support 38 and a sensor (or electromagnetic) device 54 mounted atop the spindle 52. Each of the sensor assemblies 40-46 is thus coupled to the support 38 to rotate about sensor axes 56 that extend along the z-axis and are substantially co-planar.

Each of the sensor assemblies 40-46 includes a sensor device 54 with unique electromagnetic utilities and capabilities. For example, the sensor devices 54 may include an infrared (IR) camera, an electro-optical (EO) camera, a laser designator (LD), and a laser range finder (LRF). Additionally, although only one is shown, each of the sensor devices 54 have a field of operation 58 (e.g., field of view, field of detection, etc.) with a central axis 60 that intersects the sensor axis 56 of the respective sensor assembly 40-46. As shown, the central axes 60 of the fields of view 58 are substantially co-planar (i.e., within a plane). Furthermore, each of the sensor assemblies 40-46 is arranged such that the central axes 60 are substantially parallel.

Still referring to FIGS. 3 and 4, the sensor actuator 48 is connected to the upper side of the support 38 and in one embodiment includes an electric motor. The sensor assemblies are coupled to the sensor actuator 48 through a series of wires or cables 62. Specifically, the spindle 52 of sensor assembly 46 is rotatably coupled to the sensor actuator 48 such that rotation (or actuation) of the sensor actuator 48 causes sensor assembly 46 to rotate. The spindle 52 of sensor assembly 44 is rotatably coupled to the spindle 52 of sensor assembly 46 such that rotation of sensor assembly 46 causes simultaneous rotation of sensor assembly 44. Sensor assembly 42 is similarly coupled to sensor assembly 44, and sensor assembly 40 is likewise coupled to sensor assembly 42. As a result, the central axes 60 of the fields of view 58 of the devices 54 remain parallel during operation.

As shown in FIG. 3, the support actuator 50 is connected to the housing 28 at an end of the support 38 and is configured to rotate the support 38, as well as the components thereon, about a support axis 64 that extends substantially along the y-axis and intersects and is substantially perpendicular (or orthogonal) to the sensor axes 56 and is parallel to the plane of the central axes 60 of the fields of view 58. In one embodiment, the support actuator 50 is an electric motor.

Referring again to FIG. 1, the electronic controller 26 includes electronic components, including various circuitry and/or integrated circuits, such as field programmable gate arrays (FPGAs), application specific integrated circuits (ASICs), discrete logic, microprocessors, microcontrollers, and digital signal processors (DSPs), and/or instructions stored on a computer readable media (e.g., on-board random access memory (RAM) and on-board read only memory (ROM)) to be carried out by the circuitry to individually or jointly perform control the flight of the MAV 10 as well as perform the other the methods and processes described below. Although not specifically shown, the electronic controller 26 is in operable communication with the actuator 14 and the sensor system 24, including the sensor devices 54, the sensor actuator 48, and the support actuator 50, as well as other components of the MAV 10 that are not shown.

During operation, the actuator 14 provides power to the rotor 18 through the drive shaft 16 to create a suitable amount of lift within the main duct 12 to cause the MAV 10 to fly. The sub-ducts 20 are used to more particularly direct the lift in order to control the direction of flight, as well as create a suitable anti-torque force on the MAV 10 to prevent unwanted rotation.

Referring FIGS. 2-4, the sensor assemblies 40-46 are arranged such that the fields of view 58 thereof are directed through the window 34 on the housing 28 and used for various purposes depending on the particular types of sensor devices 54 installed. For example, electro-optical and infra-red cameras may be used for surveillance, laser designators may be used to electromagnetically mark, or "paint," a target for laser-guided weapons, and laser range finders may be used to determine various distances, as is commonly understood. The sensor actuator 48 is used to rotate the sensor assemblies 40-46 about the sensor axes 56 so that the sensor devices 54 are turned in the azimuth direction. Because of the coupling of the spindles 52 through the wires 62, the central axes 60 of the fields of view 58 of the sensor devices 54 remain parallel. The support actuator 50 is used to rotate the sensor assemblies 40-46 about the support axis 64 so that the electromagnetic devices are turned in the elevation direction. The rounded shape of the window 34 allows the sensor devices 54 to operate in directions nearly parallel with the z-axis.

One advantage of the sensor system described above is that because of the substantially linear arrangement of the sensor assemblies the amount of torque required to rotate the sensor assemblies in the elevation direction is reduced. Another advantage is that because only the sensor assemblies, as opposed to the entire platform, rotate in the azimuth direction, the mass required for any azimuth gimbal is reduced, further reducing the torque required for rotation in the elevation direction, as well as the overall weight of the system. Thus, a smaller, less powerful elevation actuator may be used, which further saves weight and reduces the overall costs of the MAV. Further, because of the reduced weight, the sensor system may be positioned more closely to the center of gravity of the MAV, thus reducing the likelihood that counter balancing will be required.

Other embodiments may be utilized in land vehicles, watercraft, and aircraft other than MAVs, such as military, commercial, and private propeller or jet engine driven airplanes, commercial jet liners, and helicopters, as well as other unmanned aerial vehicles (UAV) other than MAVs. Although the system above is described as having the sensors aligned with the y-axis, or elevation axis, it should be understood that the sensors may be aligned in other directions, such as along the z-axis, or azimuth axis. Although a single sensor actuator is shown, multiple actuators may be used to rotate the sensor devices about the sensor axes. Also, different numbers of sensor assemblies and/or sensor devices may be used, including as few as three. Other types of electromagnetic devices may be used other than those described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular sensor system comprising:
a support;
a first sensor coupled to the support and configured to rotate about a first sensor axis, the first sensor having a first field of detection with a first central axis;
a second sensor coupled to the support and configured to rotate about a second sensor axis, the second sensor having a second field of detection with a second central axis;
a third sensor coupled to the support and configured to rotate about a third sensor axis, the third sensor having a third field of detection with a third central axis;
a support actuator coupled to the support and configured to rotate the support about a support axis,
wherein the first, second, and third central axes are substantially within a plane; and
at least one sensor actuator coupled to the first, second, and third sensors and the support and configured to cause said rotation of the first, second, and third sensors about the respective first, second, and third sensor axes.

2. The vehicular sensor system of claim 1, wherein the support axis is substantially orthogonal to the first, second, and third sensor axes and substantially parallel to the plane.

3. The vehicular sensor system of claim 1, wherein the first, second, and third sensor axes are substantially co-planar.

4. The vehicular sensor system of claim 3, wherein the first, second, and third central axes are substantially parallel.

5. The vehicular sensor system of claim 1, wherein the at least one sensor actuator is coupled to the first sensor to cause said rotation thereof, the second sensor is coupled to the first sensor such that rotation of the first sensor simultaneously causes said rotation of the second sensor, and the third sensor is coupled to the second sensor such that rotation of the second sensor simultaneously causes said rotation of the third sensor.

6. The vehicular sensor system of claim 5, further comprising a fourth sensor coupled to the support to rotate about a fourth sensor axis that is substantially co-planar with the first, second, and third sensor axes, having a field of detection with a fourth central axis that is substantially co-planar and parallel with the first, second, and third central axes, and coupled to the third sensor such that rotation of the third sensor simultaneously causes said rotation of the fourth sensor.

7. The vehicular sensor system of claim 6, wherein the first, second, third, and fourth sensors comprise one of an infrared camera, an electro-optical camera, a laser designator, and a laser range finder.

8. A vehicular sensor system comprising:
a support;
a first sensor coupled to the support and having a first field of detection with a first central axis;
a second sensor coupled to the support and having a second field of detection with a second central axis;
a third sensor coupled to the support and having a third field of detection with a third central axis;
a support actuator coupled to the support and configured to rotate the support about a support axis,
wherein the first, second, and third central axis are substantially within a plane and the support axis is substantially parallel to the plane, wherein the first, second, and third central axes are substantially parallel; and
at least one sensor actuator coupled to the first, second, and third sensors and the support and configured to cause said rotation of the first, second, and third sensors about respective first, second, and third sensor axes.

9. The vehicular sensor system of claim 8, wherein the first, second, and third sensors are coupled to the support to rotate about the respective first, second, and third substantially co-planar sensor axes that are substantially orthogonal to the support axis.

10. The vehicular sensor system of claim 8, wherein the at least one sensor actuator is coupled to the first sensor to cause said rotation thereof, the second sensor is coupled to the first sensor such that rotation of the first sensor simultaneously causes said rotation of the second sensor, and the third sensor is coupled to the second sensor such that rotation of the second sensor simultaneously causes said rotation of the third sensor.

11. The vehicular sensor system of claim 10, wherein the support is a substrate with first and second opposing sides, the first, second, and third sensors being on the first side of the substrate.

12. The vehicular sensor system of claim 11, wherein the first, second, and third comprise one of an infrared camera, an electro-optical camera, a laser designator, and a laser range finder.

13. An unmanned aerial vehicle (UAV) comprising:
   a frame;
   a flight system coupled to the frame and configured to apply lift to the frame;
   a sensor array coupled to the frame and comprising:
      a support; and
      first, second, and third sensors coupled to the support to rotate about respective first, second, and third substantially parallel sensor axes and having fields of detection with respective first, second, and third substantially co-planar central axes;
   a processor coupled to the frame and in operable communication with the flight system and the sensor array, the processor being configured to control said application of lift to the frame and said rotation of the first, second, and third sensors; and
   at least one sensor actuator is coupled to the first sensor to cause said rotation thereof, the second sensor is coupled to the first sensor such that rotation of the first sensor simultaneously causes said rotation of the second sensor, and the third sensor is coupled to the second sensor such that rotation of the second sensor simultaneously causes said rotation of the third sensor.

14. The UAV of claim 13, wherein the sensor array further comprises a support actuator coupled to the frame and the support and configured to rotate the support about a support axis that is substantially orthogonal to the first, second, and third sensor axes and substantially parallel to the first, second, and third central axes.

15. The UAV of claim 14, wherein the sensor axes are substantially parallel to an azimuth axis of the UAV and the support axis is substantially parallel to an elevation axis of the UAV.

16. The UAV of claim 15, wherein the first, second, and third sensor axes are substantially co-planar and the first, second, and third central axes are substantially parallel.

17. The UAV of claim 13, wherein the UAV is a micro air vehicle (MAV).

\* \* \* \* \*